United States Patent Office 3,232,982
Patented Feb. 1, 1966

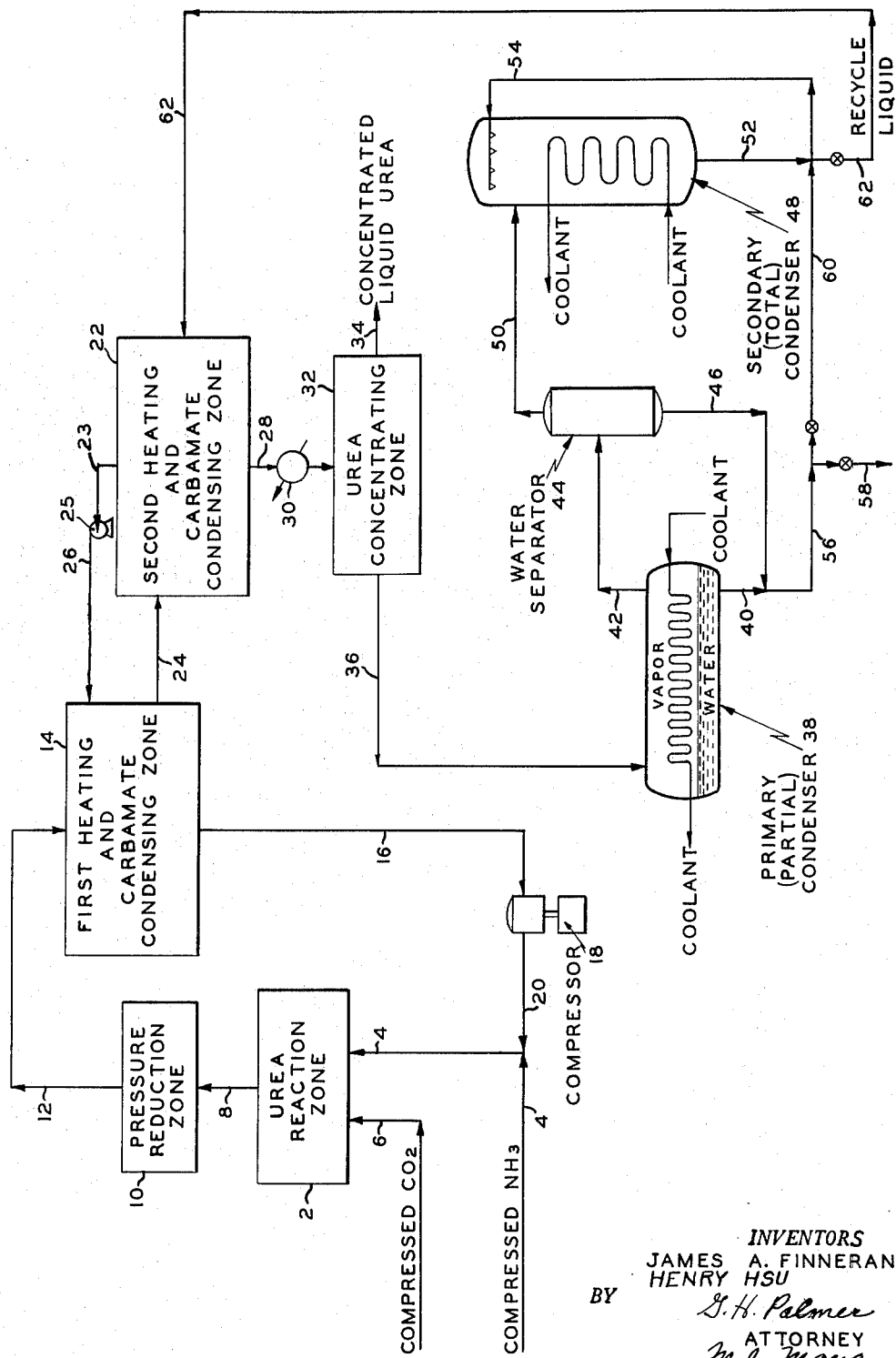

3,232,982
UREA SYNTHESIS
James A. Finneran, Garden City, and Henry Hsu, New Rochelle, N.Y., assignors to Pullman Incorporated, a corporation of Delaware
Filed Jan. 8, 1960, Ser. No. 1,217
8 Claims. (Cl. 260—555)

This invention relates to a process for synthesizing urea from ammonia and carbon dioxide. In one aspect this invention relates to a process for obtaining a higher conversion of carbon dioxide to urea. Another aspect of this invention relates to the total recycle of unreacted carbon dioxide and ammonia in a process for the synthesis of urea.

It is well known that urea can be synthesized by reacting ammonia and carbon dioxide under relatively high temperatures and pressures to produce a melt containing urea, water, and ammonium carbamate. The urea is seprated from the carbamate by-product, and the by-product is recycled to the urea reactor under the conditions employed therein. It has also been the practice in the art to further concentrate and recover urea from the liquid fraction after separation of the carbamate intermediate product. In concentrating liquid urea, it has been found that the liquid urea fraction contains not more than 80 percent urea while the remainder of the mixture in the concentrator is comprised of ammonia, carbon dioxide and water. Thus, at least 20 percent of the mixture may be separated as a vapor from the liquid urea product.

Because the ammonia conversion to urea is usually only 50 percent per pass, there is always the problem of what to do with unreacted ammonia and carbon dioxide. Some manufacturers have solved the problem by simply using these unreacted components in other processes. However, since the demand for urea is growing faster than the demand for its by-products, most urea synthesis processes include at least a partial recovery of unconverted reactants as by the recovery and recycle of ammonium carbamate and in all processes total recovery is highly desirable.

Some techniques have been developed for totally recovering the ammonia and carbon dioxide values during the concentration of urea in the urea synthesis process, for, with total recovery of reactants, the economics of the above process can be markedly improved and 100 percent conversion of $CO_2$ and $NH_3$ to urea can be obtained. Thus, in order to obtain total recovery and recycle of these gases, elaborate methods for separately recovering and compressing carbon dioxide and ammonia have been proposed. One of these methods involves the use of a selective adsorption tower wherein the ammonia is chemically absorbed in an absorbent and the carbon dioxide is released as a vapor, for recycle to the urea reactor after sufficient compression. The absorbed ammonia is then desorbed, separately compressed and recycled to the reactor. Another method which is somewhat similar to that described above, is the absorption of carbon dioxide in solutions such as monoethanolamine in order to free the ammonia component. As above, carbon dioxide is desorbed, compressed and recycled, and the ammonia is separately compressed and recycled to the reactor.

Although the above methods have been employed, it has been found that the cost of operation is enormously increased by the intricate steps involved and the cost of the chemicals used in this recovery process. Other disadvantages in the above methods include the multiplicity of operations necessary for the recovery and the high compression demands in the recovery of the overall processes.

Therefore, it is an object of the present invention to overcome the difficulties outlined above and to provide a simplified and more economical method of recovering ammonia and carbon dioxide reactants.

Another object of this invention is to provide a commercially feasible and economical process for the total recycle of undeacted carbon dioxide and ammonia in the synthesis of urea.

Still another object of this invention is to provide a process for synthesis of urea having a higher percent conversion of carbon dioxide than heretofore obtainable.

Another object of this invention is to provide a method for lowering the compression requirements of a total recycle urea synthesis process.

These and other objects of this invention will become apparent to those skilled in the art from the following description and disclosure.

According to the present invention, a urea synthesis mixture obtained from the reaction between carbon dioxide and ammonia from which the ammonium carbamate intermediate product has been removed, is passed to a urea concentrator wherein liquid urea is separated as a product from a vaporous fraction containing carbon dioxide, ammonia and water. The vaporous fraction is passed to a primary condenser wherein it is subjected to partial condensation under controlled conditions conducive to the separation of a liquid phase comprising substantially water and to the avoidance of phase equilibrium during said condensation. In a preferred embodiment, this stage of the operation is carried out by passing the vaporous fraction containing carbon dioxide, ammonia and water through the primary condenser at a gradually decreasing temperature to insure continuous separation with immediate isolation of vapor and liquid phases therein.

The resulting vaporous phase, concentrated in ammonia and carbon dioxide, is then withdrawn from the primary condenser and passed to a secondary condenser wherein it is totally condensed and thoroughly mixed to obtain a homogeneous condensate. This totally condensed equilibrium mixture is then recycled to the urea reactor as part of the feed thereto.

In a preferred embodiment of this invention, the homogeneous mixture is obtained by recycling a portion of the condensate concentrated in ammonia and carbon dioxide to the upper portion of the secondary condenser at a point immediate the incoming vapors, in order to enhance cooling and provide intimate contact with the vapors from the primary condenser. The condensate withdrawn from the secondary condenser is then recycled either directly or indirectly to the urea reactor under suitable conditions of temperature and pressure.

Generally the process for synthesizing urea comprises reacting carbon dioxide with an excess, over the 1:2 stoichiometric mole ratio of ammonia in a high pressure reactor or autoclave. The mole ratio of carbon dioxide to ammonia during the synthesis reaction is usually between about 1:2.5 and about 1:15, while the operating conditions are maintained at a temperature of between about 300° F. and about 500° F. under from 1700 p.s.i.a. to about 3500 p.s.i.a., although pressures up to 8000 p.s.i.a. as set forth in U.S. Patent 2,087,980 may be employed, if desired. The overall reaction is illustrated by the following equations:

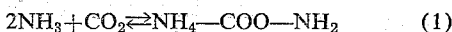
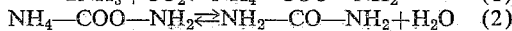

$$2NH_3 + CO_2 \rightleftarrows NH_4\text{—COO—}NH_2 \quad (1)$$
$$NH_4\text{—COO—}NH_2 \rightleftarrows NH_2\text{—CO—}NH_2 + H_2O \quad (2)$$

Since the overall reaction is exothermic, provision for cooling must be supplied and usually this condition is satisfied by employing a jacketed, water-cooled reactor. After reaction, the synthesis mixture or reactor effluent, which is in the form of a melt, is withdrawn, depressurized by expansion to between about 150 p.s.i.g. and about 400 p.s.i.g. The depressurized synthesis mixture is then heated to vaporize the ammonium carbamate intermediate as carbon dioxide and ammonia vapors and the vapors, including a small amount of water, are rapidly withdrawn from the aqueous urea solution in a carbamate separating and condensing zone. In the carbamate separating and condensing zone, a major portion of the urea contaminants or unconverted reactants comprising ammonia and carbon dioxide are removed and are condensed to reform an aqueous amomnium carbamate solution admixed with free ammonia. The resulting condensate is recycled to the reactor as part of the feed thereto after compressing the condensate to a pressure slightly above that which is employed in the reactor. The temperature at which the condensate enters the reactor is approximately the condensation temperature of the ammonium carbamate but below the temperature employed in the reactor.

After removing at least a major portion of the unconverted reactants as vapor, the aqeuous urea fraction is passed to a urea concentrator wherein water and the remaining ammonia, carbon dioxide reactants are withdrawn as a vapor from the concentrated liquid urea product. The urea product may be further treated by evaporation, crystallization and/or prilling to suit the requirements of the manufacturer and any additional ammonia and/or carbon dioxide vapors, which may be separated in subsequent treatment, can be returned to the urea concentrator or the vapors removed from the urea concentrator.

As hereinabove described, a major portion of the unconverted reactants are removed in the carbamate separating zone. In a preferred embodiment of the present synthesis of urea, the expanded and heated synthesis mixture from the reactor is passed to a first heater and carbamate condenser where under a pressure of from about 150 p.s.i.g. to about 400 p.s.i.g., a major portion of the carbon dioxide and ammonia and a minor portion of water are separated as vapors from the aqeuous urea solution. The vapors are condensed and the resulting liquid, containing aqueous ammonium carbamate is recompressed and returned to the reactor under the conditions set forth above. The aqeuous urea solution is passed to a second heater and carbamate condenser where, under a lower pressure of from about 0 p.s.i.g. to about 50 p.s.i.g., additional quantities of the unconverted reactants are separated as vapors. These reactants are withdrawn from the aqeuous urea fraction and condensed in the second carbamate condenser in the manner set forth above. The resulting condensate (ammonium carbamate), is compressed to a pressure slightly above that employed in the first carbamate condensed and then recycled to the first carbamate condensed for mixture with ammonium carbamate therein.

It is to be understood, however, that the ammonium carbamate separated and condensed in the second carbamate condenser may be withdrawn, recompressed and recycled directly to the reactor, at a temperature below the reaction temperature, if desired.

When employing this preferred method of operation, the amount of ammonia and carbon dioxide reactants remaining in the aqueous urea fraction withdrawn from the second carbamate condenser, is relatively small, i.e., below about 8 percent, and usually below about 5 percent. However, when only one carbamate separator and condenser is employed, the amount of reactants remaining in the aqueous urea solution is between about 15 percent and about 30 percent based on the reactants in the reactor effluent.

Each of the carbamate strippers are preferably provided with a reflux absorption zone from which inert gases which build up in the process can be removed and wherein the ammonia and/or carbon dioxide which enter the absorption zone with the inert gas are absorbed in an aqueous medium which is maintained in the absorber. The absorbed material and absorbent are returned to the carbamate condenser after venting the inert gas.

The aqueous urea fraction withdrawn from the last or second carbamate condenser is then heated and passed to a urea concentrator. In accordance with the present invention the urea concentrator comprises a vaporization zone wherein the remaining unconverted reactants are removed as vapors from the liquid urea product at a temperature above the crystallization temperature of urea or between about 190° F. and about 310° F. under from about 0 p.s.i.g. to about 30 p.s.i.g., preferably at a temperature of between about 200° F. and about 300° F. under from about 0 p.s.i.g. to about 15 p.s.i.g. The unconverted reactants removed in this stage of the process when only one carbamate condenser is employed, comprise not more than 30 percent of the total reactants in the reactor effluent and preferably, when employing a plurality of carbamate condensers, not more than 5 percent of the total reactants originally present in the reactor effluent.

The unconverted reactants in the urea concentrator are then withdrawn therefrom and passed to a primary or partial condenser which is maintained at a gradually decreasing temperature between about 310° F. to about 100° F., preferably at an entrance temperature of from about 200° F. to about 300° F. and an exit temperature of from 150° F. to about 250° F.

The vapors are introduced into the entrance or high temperature portion of the primary condenser and pass to the exit or cooler portion of the condenser during which passage water is continuously condensed as a result of the controlled and gradually decreasing temperature maintained therein by a cooling coil containing coolant. The condensate is immediately and continuously withdrawn from the vapor phase in the upper portion of the condenser by gravitational separation. Thus, the vapor phase is conducted through the condenser in a vapor section remote and separated from the passage of liquid in the liquid section of the condenser.

The conditions in the primary condenser are so controlled that a condensate almost entirely composed of water is obtained, while substantially the total portion of carbon dioxide and ammonia components remain in the vaporous phase. Since the vapors and liquid are isolated from each other in remote sections of the primary condenser, the water is withdrawn through a port in the lower portion of the condenser while the vapors are removed from the condenser through a separate port in the upper portion thereof. The water collected in the primary condensation zone is at a higher temperature than the vapors from which it is withdrawn, consequently the condensate contains only a small amount of the reactant vapors, while the vapor may contain a considerable amount of water vapor. The water separated from the vapors generally contains not more than 5 percent ammonia and preferably not more than 2 percent. The gaseous phase, concentrated in carbon dioxide and ammonia, is then passed for total condensation to a secondary condenser operated at a temperature of between about 50° F. and about 140° F. under from 0 p.s.i.g. to about 30 p.s.i.g., preferably between about 80° F. and about 120° F. under from about 0 p.s.i.g. to about 15 p.s.i.g. An equilibrium mixture is formed in the secondary condenser as a result of maintaining suitable mixing conditions therein.

In one embodiment of the present invention, equilibrium conditions are maintained in the secondary condenser by intimate mixing which is achieved by recycling a portion of the condensate formed therein to the upper portion of the condenser, preferably as a spray over or opposite the point of incoming vapors. The amount of condensate recycled varies between about 30 percent and about 70 percent of the total condensate; although it is to be understood that greater amounts may be recycled, if desired. In addition to providing an intimate mixture, the recycle condensate aids in cooling the incoming vapors to the condensation temperature.

The temperature in the primary and secondary condensers can be maintained by any convenient method, although it has been found that condensers water-cooled by internal cooling coils are both convenient and inexpensive to operate and are therefore recommended in these stages of the process.

The remaining portion of the condensate formed in the secondary condenser, which is not recycled to the secondary condenser, is then returned to the urea synthesis process. This may be accomplished either by compressing and heating the remaining condensate and directly recycling it to the urea reactor or by compressing and returning the condensate to the first and/or second carbamate separator and condenser for recycling with the ammonium carbamate and ammonia condensate separated therein. However, it is preferred to recycle the low pressure condensate from the secondary condenser to the second carbamate condenser since the recompression requirements are reduced thereby.

Since it is also desirable to supply water to the carbamate separator in order to retain the ammonium carbamate in solution, a controlled amount of the water removed ammonia-carbon dioxide vapors in the primary condenser may be recycled to the carbamate separator or may be admixed with the ammonia-carbon dioxide condensate prior to recycling the concentrated ammonia-carbon dioxide condensate to the carbamate separator, if desired. Generally, the amount of water in the total urea reactor feed should not exceed about 30 percent and therefore the water contained in the recycle stream or streams should be regulated so that this percent is not exceeded.

For a better understanding of the present invention reference will now be had to the accompanying drawing which illustrates a specific embodiment of the present invention and is not to be construed as unnecessarily limiting thereto.

Ammonia and carbon dioxide in a ratio between about 2.5:1 and about 15:1, preferably between about 4:1 and about 7:1, are pressurized into urea reacting zone 2, from lines 4 and 6 respectively, wherein at a pressure of between about 1700 p.s.i.a and about 3500 p.s.i.a. and a temperature of between about 250° F. and about 450° F., preferably between about 2400 p.s.i.a and about 2900 p.s.i.a. of from about 340° F. to about 400° F., the gases are reacted to form ammonium carbamate as an intermediate product, which in turn, is converted into urea and water. Since the overall reaction is highly exothermic, this step of the process is usually carried out in a water-cooled autoclave or an autoclave cooled by any other convenient coolant which is capable of controlling the temperature therein. After the materials have reacted, the mixture in the urea reacting zone is withdrawn through line 8, expanded in pressure reduction 10 and introduced into a first heating and carbamate condensing zone or stripping zone 14 by means of line 12.

In zone 14, the liquid mixture, which has been expanded to a pressure of between about 150 p.s.i.g. and about 400 p.s.i.g., is heated to vaporize ammonium carbamate as ammonia and carbon dioxide and the resulting vapors are separated from the remaining aqueous urea solution and thereafter condensed to reform ammonium carbamate in the presence of water and free ammonia. The carbamate condensate is withdrawn from zone 14 by means of line 16, passed to compressor 18 wherein the liquid is compressed to approximately the pressure employed in zone 2 added to the pressure required to pump the mixture to zone 2. The temperature of the ammonium carbamate condensate is maintained above the "salting-out" temperature of the carbamate and below the temperature employed in the reactor. Thus, the compressed carbamate condensate which is recycled to zone 2 through lines 20 and 4, aids in controlling the temperature of the exothermic reaction.

The aqueous urea solution is withdrawn from the first heating and carbamate condensing zone 14 and passed to the second heating and carbamate condensing zone 22 by means of line 24. In zone 22, which is maintained at a pressure between about 0 p.s.i.g. and about 50 p.s.i.g., preferably between about 10 p.s.i.g. and about 20 p.s.i.g., the aqueous urea solution is again heated to vaporize ammonium carbamate as ammonia and carbon dioxide vapors. These vapors, together with some water, are then condensed to reform the carbamate, withdrawn from zone 22 by means of line 23 and returned by line 26 to the ammonium carbamate condensate in zone 14 after proper repressurization in pump 25 for recycle to zone 14.

Each of the carbamate condensers preferably employed in the presently described urea synthesis process is a two-compartment pressure vessel lined with stainless steel. The upper part of each vessel is a gas-liquid separator and the lower section is a condenser, equipped with a stainless steel water-cooled coil.

In the carbamate condenser, unreacted ammonia and carbon dioxide enter the separator section, pass through a downcomer pipe and, as a result of the cooling, condense and react to form an aqueous ammonium carbamate solution. This liquid stream exits from the bottom of the carbamate condenser as recycle to the urea reactor.

The remaining aqueous urea fraction in zone 22 is then withdrawn by line 28, passed through heater 30 wherein the liquid fraction is heated to a temperature of between about 200° F. and about 310° F. under from about 0 p.s.i.g. to about 50 p.s.i.g., preferably between about 200° F. and about 300° F. under from about 0 p.s.i.g. and about 20 p.s.i.g. and is then introduced into urea concentrating zone 32.

Entering heater 30, the aqueous urea fraction, preferably contains not more than about 5 percent unconverted reactants, namely ammonia and carbon dioxide based on the reactants in the reactor effluent. In zone 32 the mixture is separated into a vaporous reactant phase and a liquid phase so that concentrated aqueous liquid urea, substantially free of contaminants, may be withdrawn as a product from the lower portion of zone 32 through line 34. The vaporous phase is passed to a primary condenser 38, by means of line 36, wherein the vapors are partially condensed by indirect heat exchange with water circulating through an internal refrigeration coil. As the vapors progress through the condenser, the temperature is controlled in a gradually and decreasing manner so that at the entrance port, the temperature is between about 200° F. and about 300° F.; most preferably between about 250° F. and about 270° F., while at the exit of the condenser, the temperature is preferably between about 150° F. and about 250° F., most preferably between about 175° F. and about 225° F.

Condenser 38 is so disposed that the passage of vapors therethrough is maintained in the upper portion thereof and contact with continuously condensing, and condensed water in the bottom portion of the condenser is avoided. As a result of this partial condensation, a liquid stream of water containing not more than 5 weight percent ammonia is withdrawn from the lower portion of the condenser 38 by means of line 40, whereas a vaporous fraction preferably composed of at least 20 weight percent ammonia and carbon dioxide, is withdrawn from condenser 38 by means of line 42 from which the vapors are passed to water separator 44.

In water separator 44, a small amount of liquid water, which is entrained with the vapors, is separated by gravity and withdrawn by means of line 46 for admixture with water condensate in line 40. In some cases it is desirable to provide a coalescing device such as, for example, a wire impingement mat in zone 44 to facilitate the removal of entrained water.

The resulting vapors, concentrated in ammonia and carbon dioxide are passed by line 50 into secondary condenser 48 wherein the vapors are totally condensed by contact with water in a indirect heat exchanger. The totally condensed vapors are withdrawn from the secondary condenser by means of line 52 and a portion thereof recycled to the top of condenser 48 by means of line 54 from which the liquid material is sprayed into condenser 48, at a point above the entrance of vapors from line 50. Thus, the recycled condensate in line 54 aids in lowering the temperature of the incoming vapors and provides intimate contact therewith to obtain an equilibrium mixture in zone 48.

All, or a portion of the water withdrawn from condenser 38 and separator 44 can be removed from the system if desired by means of lines 40, 56 and valved line 58. However, a small proportion of this water can be admixed, in a controlled amount, with concentrated condensate in line 52 by means of valved line 60. Since a small amount of water is beneficial in the present process for maintaining ammonium carbamate in solution, the ammonia-carbon dioxide condensate, which is recycled to the secondary heating and carbamate condensing zone 22 by means of valved line 62 for admixture with ammonium carbamate separated therein, preferably contains between about 60 percent and about 80 percent water. The condensate withdrawn in valved line 62 is pumped to a pressure slightly above that employed in the second heating and carbamate condensing zone by means of pump 25.

Thus, a total recycle urea synthesis process is provided by employing this economic and simplified method and 100 percent conversion of carbon dioxide to ammonia is realized without the use of extraneous chemicals.

It is to be understood that many modifications and alterations of the above-described process will become apparent to those skilled in the art without departing from the scope of this invention. For example, the liquid ammonia and carbon dioxide recycled to the system in line 62 may be totally or partially passed, after suitable compression, to the primary heating and carbamate condensing zone 14 for admixture with the ammonium carbamate condensate therein, or the liquid ammonia and carbon dioxide in recycle line 62 can be separately compressed, heated and returned directly to urea reacting zone 2, if desired. However, optimum results have been obtained when following the procedure outlined in the above drawing.

The following example, carried out in accordance with the procedure described above and shown in the drawing, further illustrates this invention and is not to be construed as limiting the scope thereof.

EXAMPLE 1

A liquid effluent obtained from the reaction between carbon dioxide and ammonia, after separation of ammonium carbamate condensate in two heating and carbamate condensing zones, is passed to a urea concentrator wherein, at a temperature of about 265° F. under 5 p.s.i.g., a vaporous fraction containing water, ammonia and carbon dioxide is separated from liquid urea.

*Composition of feed to concentrator*

| | Pounds |
|---|---|
| Urea | 19,707 |
| Water | 8,617 |
| Ammonia | 369 |
| Carbon dioxide | 195 |

The vaporous fraction is passed to a primary condenser wherein the aqueous portion of the mixture is continuously condensed and separated from the ammonia and carbon dioxide vapors. The vaporous effluent from the concentrator enters the condenser at a temperature of about 265° F. under 4 p.s.i.g. and is gradually cooled to a temperature of 200° F. by indirect heat exchange with a coolant, i.e., water, circulating through a refrigeration coil. The counter-current flow of water and vaporous effluent allows for gradual and controlled cooling of the vapors so that water is continuously condensed therefrom.

The condenser is horizontally disposed to allow for continuous separation and collection of water in the lower portion thereof, remote from the location of vapors passing through the upper portion of the condenser thus preventing the formation of an equilibrium mixture in the primary condenser. The vapor is withdrawn from the primary condenser at a temperature of about 200° F. and the water is separately withdrawn at a temperature of 225° F. The vaporous effluent containing 319 pounds of ammonia and 187 pounds of carbon dioxide is then passed to a secondary condenser wherein, at a temperature of about 100° F., under 1 p.s.i.g., the vapors were totally condensed by indirect heat exchange with a coolant, i.e., water, passing through a refrigeration coil. In the secondary condenser, equilibrium conditions were maintained by recycling a portion (about 50 percent) of the condensate withdrawn therefrom to the upper portion of the condenser and by spraying the recycled liquid over the incoming vapors to aid in cooling and to provide intimate contact therewith. The remaining portion of the condensate withdrawn from the secondary condenser was then compressed to 16 p.s.i.g., and recycled to the second carbamate separator, which is operated at a condensation temperature of about 115° F. under about 14 p.s.i.g.

Having thus described our invention, we claim:

1. In the synthesis of urea wherein carbon dioxide is reacted with ammonia in a reaction zone to produce a product mixture containing ammonia, water, urea and ammonium carbamate and wherein the product mixture is treated to remove ammonium carbamate leaving a mixture substantially free of said carbamate and containing ammonia, carbon dioxide, water and urea, an improved process for recovery of unreacted ammonia and carbon dioxide which comprises: passing the liquid reaction mixture containing urea, water, unreacted ammonia and carbon dioxide to a separation zone wherein water and unreacted ammonia and carbon dioxide are separated as a vaporous fraction from liquid urea, passing said vaporous fraction to a partial condensation zone wherein water is continuously condensed and isolated from the remaining vapors during residence in said condensation zone and maintaining a liquid water phase superimposed by a vapor phase within the partial condensation zone to prevent the formation of an equilibrium mixture, withdrawing the ammonia-carbon dioxide vapors from said condensation zone, and passing said ammonia-carbon dioxide vapors to a total condensation zone wherein the unreacted ammonia and carbon dioxide are condensed and an equilibrium mixture is maintained.

2. In the synthesis of urea wherein carbon dioxide is reacted with ammonia in a reaction zone, the reaction mixture is passed to a carbamate stripping and condensing zone, wherein ammonium carbamate vapor is separated from a liquid urea fraction and condensed, the liquid urea fraction substantially free of ammonium carbamate is passed to a separating zone wherein a gaseous fraction containing water, ammonia and carbon dioxide is separated from liquid urea, the improved method for recycle of the unreacted gaseous components which comprises: passing the vaporous fraction from the separator to a primary condensation zone wherein water is continuously condensed and immediately withdrawn from the remaining carbon dioxide-ammonia vapors during residence in the condensation zone and maintaining a liquid water phase superimposed by a vapor phase within the primary condensation zone to prevent the formation of an equilibrium mixture, separately withdrawing the water and the vapors from said primary condensation zone, passing said vapors to a secondary condensation zone wherein the unreacted carbon dioxide and ammonia are condensed and an equilibrium mixture is maintained, and recycling the resulting condensate to the urea reaction zone.

3. In the synthesis of urea wherein carbon dioxide is reacted with ammonia in a reaction zone, the reaction mixture is passed to a carbamate stripping and condensing zone wherein ammonium carbamate vapor is separated from liquid urea and condensed, the liquid urea fraction substantially free of ammonium carbamate is passed to a separating zone wherein a gaseous fraction containing water, carbon dioxide and ammonia is separated from liquid urea, the improved method for total recycle of carbon dioxide and ammonia components which comprises: passing the vaporous fraction from the separating zone to a primary condensation zone wherein, at a gradually decreasing temperature, water is continuously condensed and immediately withdrawn from the remaining ammonia and carbon dioxide vapors during residence in the partial condensing zone and maintaining a liquid water phase superimposed by a vaporous carbon dioxide and ammonia phase within the primary condensation zone to prevent the formation of an equilibrium mixture, separately withdrawing the water and the vapors from said primary condensation zone, passing said vapors to a secondary condensation zone wherein ammonia and carbon dioxide are totally condensed, recycling a portion of the resulting condensate to the carbamate condensing zone for ultimate recycle to the urea reaction zone and maintaining an equilibrium mixture in said secondary condensation zone by recycling the remaining portion of ammonia-carbon dioxide condensate to the upper portion of the secondary condensation zone for intimate mixture with incoming vapors.

4. In the synthesis of urea wherein carbon dioxide is reacted with ammonia in a reaction zone, the reaction mixture is passed to a first carbamate stripping and condensing zone wherein ammonium carbamate vapor is separated from aqueous urea and condensed, the resulting condensed ammonium carbamate is recycled to the reaction zone under the pressure employed therein, the aqueous urea fraction is withdrawn from said first carbamate stripping zone and passed to a second carbamate stripping and condensing zone wherein an additional amount of ammonium carbamate is separated from the aqueous urea fraction and condensed, the condensed ammonium carbamate in said second carbamate stripping and condensing zone is withdrawn and recycled to said first carbamate stripping zone under the pressure employed therein for mixture with the first separated ammonium carbamate, and the remaining aqueous urea fraction substantially free of ammonium carbamate is passed to a separating zone wherein a gaseous fraction containing water, carbon dioxide and ammonia is separated from liquid urea, the improved method for total recycle of carbon dioxide and ammonia components which comprises: passing the vaporous fraction from the separating zone to a primary condensation zone wherein, at a gradually decreasing temperature, water is continuously condensed and immediately withdrawn from the remaining ammonia and carbon dioxide vapors during residence in the primary condensation zone and maintaining a continuously increasing liquid water phase containing not more than 5 percent of the unconverted reactants superimposed by a vaporous carbon dioxide and ammonia phase within the primary condensation zone to prevent the formation of an equilibrium mixture; separately withdrawing the water and the vapors from said condensation zones; passing said vapors to a secondary condensation zone wherein ammonia and carbon dioxide are totally condensed; recycling a portion of the resulting condensate to the second carbamate condenser for mixture with the ammonium carbamate therein; and maintaining an equilibrium mixture in said secondary condensation zone by recycling the remaining portion of condensate to the upper portion of the secondary condensation zone for intimate mixture with incoming vapors.

5. The process of claim 4 wherein the condensate recycled to the secondary condensation zone is distributed as a spray over the incoming ammonia and carbon dioxide vapors.

6. In the synthesis of urea wherein carbon dioxide is reacted with ammonia in a reaction zone, the reaction mixture is passed to a first carbamate stripping and condensing zone wherein ammonium carbamate is separated as a vapor from urea and condensed, the resulting condensed ammonium carbamate is recycled to the reaction zone under the pressure employed therein, an aqueous urea fraction is withdrawn from said first carbamate stripping zone and passed to a second carbamate stripping and condensing zone for separation and condensation of an additional amount of ammonium carbamate, the condensed ammonium carbamate in the second carbamate stripping and condensing zone is withdrawn and recycled to said first carbamate stripping zone under the pressure employed therein for mixture with the first separated ammonium carbamate, and the remaining liquid urea fraction substantially free of ammonium carbamate and containing not more than 5 percent unconverted ammonia and carbon dioxide reactants is passed to a separating zone wherein a gaseous fraction containing water, carbon dioxide and ammonia is separated from liquid urea, the improved method for total recycle of carbon dioxide and ammonia components which comprises: passing the vaporous fraction from the separating zone to a primary condensation zone wherein, at a gradually decreasing and controlled temperature between about 310° F. and about 100° F., water is continuously condensed and immediately withdrawn from the remaining ammonia and carbon dioxide vapors during residence in the primary condensation zone by passing the vapors in indirect heat exchange with a coolant in the primary condenser; maintaining the liquid water phase containing not more than 2 percent unconverted reactants, superimposed by the vaporous carbon dioxide and ammonia phase within the primary condensation zone to prevent the formation of an equilibrium mixture; separately withdrawing the separated water and the vapors from said primary condensation zone; passing said vapors to a holding zone wherein entrained water is separated from the vapors; passing the resulting vapors to secondary condensation zone wherein ammonia and carbon dioxide are totally condensed; admixing a controlled amount of water with the ammonia-carbon dioxide condensate which amount is not in excess of that required to maintain ammonium carbamate in solution in the recycle streams; recycling a portion of the ammonia-carbon dioxide condensate to the second carbamate condenser for mixture with the ammonium carbamate therein and ultimate recycle to the urea reaction zone; and maintaining an equilibrium mixture in said secondary condensation zone by recycling the remaining portion of the ammonia-carbon dioxide condensate to the upper portion of the secondary condensation zone for intimate mixture with incoming vapors.

7. In a urea synthesis wherein ammonia is reacted with carbon dioxide under an elevated temperature and pressure thereby producing a reaction mixture containing urea, water and unreacted ammonia and carbon dioxide, the reaction mixture is withdrawn and treated in a degasification zone to remove as much unreacted ammonia as is practicable leaving a mixture containing urea and water and a small percentage of residual ammonia and carbon dioxide, the improved process for recovering said residual ammonia and carbon dioxide which comprises: passing the liquid reaction mixture containing urea, water and unreacted ammonia and carbon dioxide to a separation zone wherein the water and the unreacted ammonia and carbon dioxide are separated as a vaporous fraction from liquid urea, passing said vaporous fraction to a partial condensation zone wherein water is continuously condensed and isolated from the remaining vapors to prevent the formation of an equilibrium mixture, withdrawing the ammonia-carbon dioxide vapors from said condensation zone, passing said ammonia-carbon dioxide vapors to a total condensation zone wherein the unreacted ammonia and carbon dioxide are condensed and an equilibrium mixture is achieved, separately withdrawing from said partial condensation zone said condensed water containing a small amount of unreacted ammonia and carbon dioxide, and passing at least a portion of said withdrawn water to waste.

8. In a urea synthesis wherein ammonia is reacted with carbon dioxide in a reaction zone under an elevated temperature and pressure thereby producing a reaction mixture containing urea, water and a substantial percentage of unreacted ammonia and carbon dioxide, the reaction mixture is withdrawn and degasified such that a liquid product mixture is obtained containing urea, water and not more than 8 percent unreacted ammonia and carbon dioxide, the improved process for recovering said unconverted ammonia and carbon dioxide which comprises: passing said liquid product mixture containing urea, water, untreated ammonia and carbon dioxide to a separation zone wherein the water and the unreacted ammonia and carbon dioxide are separated as a vaporous fraction from aqueous urea, passing said vaporous fraction to a partial condensation zone wherein water is continuously condensed and isolated from the remaining vapors to prevent the formation of an equilibrium mixture, withdrawing the ammonia-carbon dioxide vapors from said condensation zone and passing said ammonia-carbon dioxide vapors to a total condensation zone wherein the unreacted ammonia and carbon dioxide are condensed with an equilibrium mixture is maintained, separately withdrawing from said partial condensation zone said condensed water containing not more than about 5 percent unreacted ammonia and carbon dioxide and passing at least a portion thereof to waste, and recycling at least a portion of said equilibrium mixture obtained from the total condensation zone ultimately to the urea reaction zone.

References Cited by the Examiner

UNITED STATES PATENTS

| | | | |
|---|---|---|---|
| 1,429,483 | 9/1922 | Bosch et al. | 260—555 |
| 1,898,093 | 2/1933 | Miller | 260—555 |
| 2,527,315 | 10/1950 | McKay | 260—555 |
| 2,632,771 | 3/1953 | White | 260—555 |
| 2,807,574 | 9/1957 | Hirano et al. | 260—555 |
| 2,848,493 | 8/1958 | Dewling et al. | 260—555 |
| 2,913,493 | 11/1959 | Sze et al. | 260—555 |
| 3,005,849 | 10/1961 | Otsuka | 260—555 |

OTHER REFERENCES

Bolotov et al.: Chem. Abst., vol. 35 (1941), page 283 (abstr. of J. Chem. Ind., U.S.S.R., vol. 17, No. 7, p. 24 (1949).

Cronan: Chemical Engineering, vol. 66, No. 2, pp. 52, 78–81 (January 26, 1959).

Frejaques: Chimie et Industrie, vol. 60 (1948), No. 1, complete article at pp. 22–35, pp. 22–30 relied on.

Hougen et al.: Chemical Process Principles (Part 1), John Wiley and Sons, Inc. (1943), pages 53–58, and 93–98.

Okada et al.: German Auslegeschrift, 1,042,570, Nov. 6, 1958.

Otsuka et al.: 1,473, March 5, 1958 (Japanese patent, abstracted at C.A. 53 (1959), col. 3070).

NICHOLAS S. RIZZO, *Primary Examiner.*

IRVING MARCUS, WALTER A. MODANCE, HENRY R. JILES, *Examiners.*

F. A. KEIRE, *Assistant Examiner.*

UNITED STATES PATENT OFFICE
CERTIFICATE OF CORRECTION

Patent No. 3,232,982                  February 1, 1966

James A. Finneran et al.

It is hereby certified that error appears in the above numbered patent requiring correction and that the said Letters Patent should read as corrected below.

Column 1, line 20, for "seprated" read -- separated --; line 29, for "mix" read -- mix- --; column 2, line 7, for "undeacted" read -- unreacted --; line 10, after "for" insert -- the --; column 3, lines 52 and 53, for "condensed", each occurrence, read -- condenser --; column 5, lines 24 and 25, after "removed" insert -- from the --; lines 56 and 57, after "reduction" insert -- zone --; column 6, line 24, strike out "the"; column 9, line 53, for "saparating" read -- separating --; column 10, line 42, after "to" insert -- a --; column 11, line 19, for "untreated" read -- unreacted --; line 30, for "with" read -- and --; column 12, line 16, for "24" read -- 25 --.

Signed and sealed this 7th day of February 1967.

(SEAL)
Attest:

ERNEST W. SWIDER                          EDWARD J. BRENNER
Attesting Officer                      Commissioner of Patents